United States Patent
Crook et al.

(10) Patent No.: US 11,574,635 B2
(45) Date of Patent: Feb. 7, 2023

(54) POLICY AUTHORING FOR TASK STATE TRACKING DURING DIALOGUE

(71) Applicant: Microsoft Technology Licensing, LLC, Redmond, WA (US)

(72) Inventors: Paul Crook, Bellevue, WA (US); Vasiliy Radostev, Seattle, WA (US); Omar Zia Khan, Bellevue, WA (US); Vipul Agarwal, Bellevue, WA (US); Ruhi Sarikaya, Redmond, WA (US); Marius Alexandru Marin, Seattle, WA (US); Alexandre Rochette, Montreal (CA); Jean-Philippe Robichaud, Mercier (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/723,300

(22) Filed: Dec. 20, 2019

(65) Prior Publication Data
US 2020/0135201 A1   Apr. 30, 2020

Related U.S. Application Data

(63) Continuation of application No. 15/198,285, filed on Jun. 30, 2016, now abandoned.

(51) Int. Cl.
*G10L 15/22* (2006.01)
*G06F 40/35* (2020.01)
(Continued)

(52) U.S. Cl.
CPC .......... *G10L 15/22* (2013.01); *G06F 9/4881* (2013.01); *G06F 9/54* (2013.01); *G06F 40/35* (2020.01);
(Continued)

(58) Field of Classification Search
CPC ....... G10L 15/22; G10L 15/18; G10L 15/222; G10L 2015/223; G06F 40/35; G06F 9/4881; G06F 9/54
See application file for complete search history.

(56) References Cited

U.S. PATENT DOCUMENTS

| | | | |
|---|---|---|---|
| 6,311,159 B1 * | 10/2001 | Van Tichelen | G10L 15/18 704/275 |
| 7,024,348 B1 * | 4/2006 | Scholz | G06F 8/38 703/24 |

(Continued)

FOREIGN PATENT DOCUMENTS

CN   102792320 A   11/2012

OTHER PUBLICATIONS

"Non Final Office Action Issued in U.S. Appl. No. 16/831,441", dated Oct. 5, 2020, 14 Pages. (MS# 358595-US-CNT).

(Continued)

*Primary Examiner* — Fariba Sirjani

(57) ABSTRACT

Conversational understanding systems allow users to conversationally interface with a computing device. In examples, a query may be received that includes a request for execution of a task. A data exchange task definition may be accessed. The data exchange task definition assists a conversational understanding system in managing task state tracking for information needed for task execution. Using the data exchange task definition, a per-turn policy for interacting with the user computing device is generated based on the state of a dialogue with a computing device and an evaluation of a process flow chart provided by a task owner resource. The task owner resource may be independent from the conversational understanding system. A response to the query may be generated and output based on the per-turn policy. In examples, the per-turn policy is used (Continued)

to generate one or more responses during a dialogue with a user via a computing device.

20 Claims, 7 Drawing Sheets

(51) Int. Cl.
*G10L 15/18* (2013.01)
*G06F 9/54* (2006.01)
*G06F 9/48* (2006.01)

(52) U.S. Cl.
CPC ............ *G10L 15/18* (2013.01); *G10L 15/222* (2013.01); *G10L 2015/223* (2013.01)

(56) References Cited

U.S. PATENT DOCUMENTS

| | | | |
|---|---|---|---|
| 7,257,537 B2 * | 8/2007 | Ross | G10L 15/1822 704/270 |
| 2002/0133355 A1 * | 9/2002 | Ross | G10L 15/1822 704/275 |
| 2007/0203869 A1 * | 8/2007 | Ramsey | G06F 40/35 706/52 |
| 2008/0010069 A1 * | 1/2008 | Katariya | G06F 9/451 704/257 |
| 2011/0161958 A1 * | 6/2011 | Xu | G06Q 10/06 718/100 |
| 2011/0252163 A1 | 10/2011 | Villar et al. | |
| 2013/0152092 A1 * | 6/2013 | Yadgar | G10L 15/22 718/102 |
| 2014/0310001 A1 * | 10/2014 | Kains | G10L 15/32 704/270.1 |
| 2014/0379326 A1 * | 12/2014 | Sarikaya | G10L 15/18 704/9 |
| 2014/0379353 A1 * | 12/2014 | Boies | G10L 17/22 704/275 |
| 2015/0032441 A1 * | 1/2015 | Marcus | G06F 40/211 704/9 |
| 2015/0095033 A1 * | 4/2015 | Boies | G10L 15/1815 704/257 |
| 2016/0202957 A1 * | 7/2016 | Siddall | G06F 8/34 717/109 |
| 2017/0017519 A1 * | 1/2017 | Khan | H04L 51/02 |
| 2017/0091171 A1 * | 3/2017 | Perez | G06F 40/35 |
| 2017/0140755 A1 * | 5/2017 | Andreas | G10L 15/1822 |
| 2017/0178626 A1 * | 6/2017 | Gruber | G06F 40/30 |
| 2017/0235465 A1 * | 8/2017 | Marin | G06F 9/451 715/716 |
| 2020/0135201 A1 * | 4/2020 | Crook | G06F 40/35 |
| 2020/0225839 A1 * | 7/2020 | Marin | G06F 3/0482 |

OTHER PUBLICATIONS

"Office Action Issued in European Patent Application No. 17705535.7", dated Dec. 19, 2019, 5 Pages. (MS# 358595-EP-EPT).
"First Office Action and Search Report Issued in China Patent Application No. 201780004859.1", dated Dec. 9, 2020, 14 Pages. (MS# 358595-CN-PCT).
"Office Action Issued in European Patent Application No. 17705535.7", dated May 4, 2021, 6 Pages. (MS# 358595-EP-EPT).
"Office Action Issued in European Patent Application No. 17735748.0", dated Apr. 8, 2021, 14 Pages. (MS# 359673-EP-EPT).
"Second Office Action Issued in Chinese Patent Application No. 201780004859.1", dated Aug. 4, 2021, 4 Pages. (MS# 358595-CN-PCT).
"Office Action Issued in European Patent Application No. 17705535.7", dated May 9, 2022, 8 Pages. (MS# 358595-EP-EPT).

* cited by examiner

400

600

POLICY AUTHORING FOR TASK STATE TRACKING DURING DIALOGUE

CROSS-REFERENCE TO RELATED APPLICATIONS

This application is a continuation of U.S. patent application Ser. No. 15/198,285, filed on Jun. 30, 2016, the disclosure of which is hereby incorporated by reference herein in its entirety.

BACKGROUND

Conversational understanding (CU) systems allow users to interface with a computer system for and during execution of a task of interest to the user. Often, the execution of a task supported by such a CU system consists of two (possibly repeated) phases: an initial phase during which the CU system gathers information required to execute a task, followed by the invocation of the system action to complete the task, whether that system action be the display of the piece of information requested by the user, or performing a transaction involving some external (to the CU system) module. Previous state-of-the-art CU systems define a task as a process flow; at each step in the process flow, the system may request information from the user, process information obtained from the user, or make some decision about what to do next. As an example, a task may be defined implicitly by a process flow chart that is provided by a resource that is external to a CU system. Such process flows charts are by necessity very constrained. As an example, a module defining how to process user input typically restricts an understanding to a narrow class of user utterances in order keep the process flow tractable. In such cases, a user may provide an utterance that does not match with one of the narrowly accepted class of responses. This can create problems for the CU system when interacting with the user.

Examples of the present application are directed to the general technical environment related to task state tracking for management of a dialogue with a processing device.

SUMMARY

Non-limiting examples of the present disclosure describe generation and utilization of a data exchange task definition that is used for management of a dialogue with a processing device. In one example, a data exchange task definition is generated to assist a conversational understanding system managing a dialogue with at least one processing device. The task owner resource may provide a conversational understanding system with information that needs to be collected in order for execution of the task. As an example, a process flowchart may be provided by a task owner resource. The process flow chart provides a process flow for collection of information that is needed for the task owner resource to execute the task. The task owner resource is independent of a conversational understanding system. The conversational understanding system may execute a task state tracking of the information needed for execution of the task. In doing so, a data exchange task definition may be created. The data exchange task definition adapts the process flow chart for the task state tracking and execution by the conversational understanding system based on a state of a dialogue with a user computing device. The creation of the data exchange task definition may comprise: generating a per-turn policy for interacting with the user computing device based on the state of the dialogue and an evaluation of the process flow chart. The data exchange task definition may be stored for recall to assist the conversational understanding system in the task state tracking. In at least one example, executed operations may comprise: identifying one or more data representations that are sharable from the data exchange task definition. Executed operations may further comprise sharing the one or more data representations for use in generation of another data exchange task definition that relates to task state tracking for parameter data of another task.

In other non-limiting examples, an exemplary data exchange task definition may be utilized for task state tracking and generation of a response to a received query. A query may be received that includes a request for execution of a task. As an example, a query may be received from a user computing device. Processing of the query may occur, where a task is detected based on input processing of the query. A data exchange task definition may be created to assist a conversational understanding system in managing task state tracking for parameter data needed for task execution. In one example, the data exchange task definition is dynamically generated during processing of the query. However, in other examples, the data exchange task definition may be pre-generated before query processing. The creation of the data exchange task definition may comprise: generating a per-turn policy for interacting with the user computing device based on a state of the dialogue with the user computing device and an evaluation of a process flow chart that is received from a task owner resource. The task owner resource may be independent from the conversational understanding system. In examples, the per-turn policy is applicable to evaluate one or more of a plurality of turns in the dialogue. A response to receipt of the query may be generated based on application of the per-turn policy of the data exchange task definition. The response may be output to the user computing device, for example.

In further non-limiting examples, an exemplary data exchange task definition may be utilized for task state tracking and generation of a response to a received query. The data exchange task definition is used to assist a conversational understanding system in managing a dialogue with at least one user computing device. A query may be received that includes a request for execution of a task. A data exchange task definition may be accessed. The data exchange task definition assists a conversational understanding system in managing task state tracking for information needed for task execution, for example, parameter data that is data needed for a task owner resource to execute a task. In some examples, the data exchange task definition is pre-generated before the query is received. The data exchange task definition may be accessed from a storage connected with the system by a distributed network, among other examples. In other examples, the data exchange task definition may be generated during processing of a query. Using the data exchange task definition, a per-turn policy for interacting with the user computing device is generated based on the state of a dialogue with a computing device and an evaluation of a process flow chart provided by a task owner resource. The task owner resource may be independent from the conversational understanding system. An exemplary data exchange task definition may be utilized to direct the issuing of request/queries against the task owner resources (backend knowledge) or user computing device in order to obtain parameter data required to complete a dialog state tracking update (by the conversational understanding system) and ultimately required for execution of a task. A response to the query may be generated and output based on the per-turn policy. In examples, the per-turn policy is used to generate one or more responses during a dialogue with a user via a computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
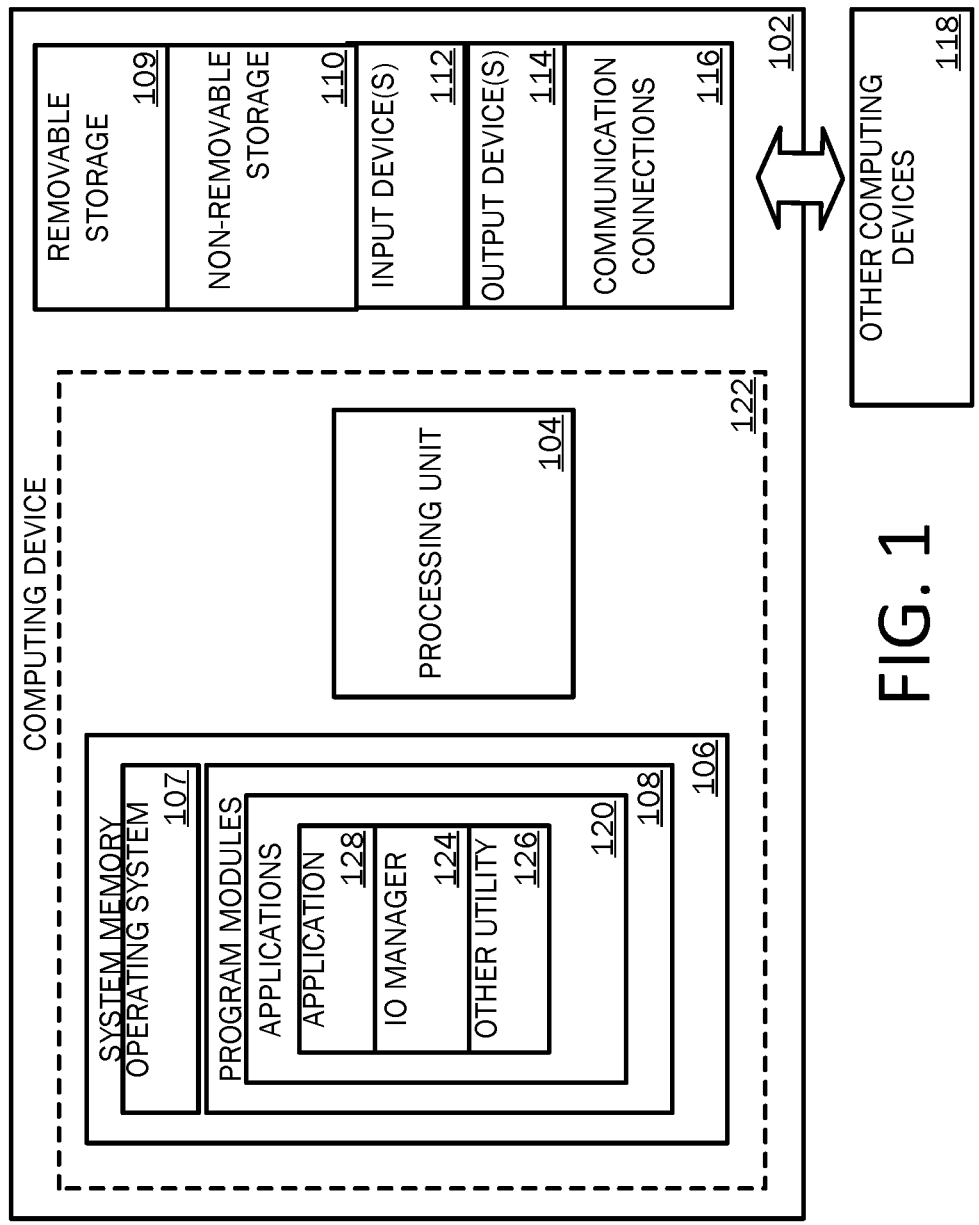
FIG. 1 is a block diagram illustrating an example of a computing device with which aspects of the present disclosure may be practiced.

Non-limiting examples describe herein relate to generation and utilization of a data exchange task definition that a conversational understanding (CU) system may utilize for management of a dialogue between two or more processing devices. A CU system may use an exemplary data exchange task definition to assist the CU system with task state tracking and for the collection of information needed for task execution. As an example, information needed for task execution may comprise parameter data that is required to be collected for a task owner resource to execute a task, among other examples. A task owner resource is any resource (e.g., system component, application, service, etc.) that is used to execute a task/action. A task owner resource is associated with a task owner that may execute a task. Task owner resources include but are not limited to: first party, second party, and third-party systems and/or application/services. Task Owner Resources may comprise data related to: (i) process flow charts for collecting parameter data for task execution, (ii) parameter data resources (e.g. connection to backend knowledge sources), and (iii) Task Actions (i.e. method to execute the target(s) action of the task). A task owner resource may provide a CU system with information that needs to be collected in order for the task owner resource to execute a task. How such information is collected is up to the CU system. A CU system may track collection of parameter data during a dialogue and may interact with a user computing device and/or task owner resource to collect information needed for task execution. In one example, the CU system may pass the collected parameter data to a task owner resource for execution of the task. In such an example, the task owner resource may be independent from the CU system, which executes the task state tracking.

An exemplary approach to task management CU systems involves defining the task in terms of data exchange. A data exchange is a representation of a task state in terms of: 1) the data that has to be collected (for task execution) and 2) the ways that a CU system can go about interacting to collect the needed data. For instance a data exchange task definition that is created in examples described herein may comprise a plurality of data structures that may relate to: the information that is be collected from the user of the CU system, prompts which the CU system can issue in order to collect the information, as well as the definition of an action that is to be executed by the CU system once all the required information has been collected from the user by the CU system. A task owner resource can provide a CU system with a process flow chart that indicates the information the task owner resource needs for task execution as well as a suggested way that the CU system can go about collecting the needed information from the user. Typically, process flow charts may be constrained in that a task owner may not anticipate all the different ways in which a user may provide the information that should be collected. For example, users may provide the information out of order, may modify previously-provided information, may themselves ask for clarifications from the system, or may ask the system to forget about information previously collected. A CU system may generate an exemplary data exchange task definition to adapt a process flow chart based on a state of a dialogue with a user computing device. The data exchange task definition accepts a much broader category of user input (as compared with only accepting input identified in a process flow chart), allowing for more flexible dialogues to be defined. Moreover, a data exchange task definition is configured to execute a per-turn policy determination during a continuing dialogue, thus allowing for a more flexible, turn-independent encoding of a task-specific policy. A CU system utilizes an exemplary data exchange task definition to make an optimal policy decision, either in a task-independent manner or by learning a per-task policy, using machine learnt models, among other examples. In one instance, a CU system augments system-wide, task-independent or per-task learned policies that are used to make a best possible policy decision at any given point in a dialogue/conversation. In making a per-turn policy decision, a data exchange task definition may elect to follow a process flow specified in a process flow chart or specify a policy override of the process flow chart to improve interaction during a dialogue. The per-turn policy of an exemplary data exchange task definition may be utilized to generate responses during multi-turn dialogues with a user (via user computing device).

Moreover, from a programming standpoint, task owner resources are concerned with execution of task (and obtaining the necessary information to execute the task). How such information is obtained is a decision that may be best left for a CU system that is designed for policy evaluation related to task state tracking. For instance, a third-party application service may be responsible for task execution where the third-party application/service may utilize an external intelligent personal assistant service to obtain parameter data necessary to execute a task. While the third-party application/service may provide guidance to the intelligent personal assistant service as to what information is needed to complete the task and general instruction as to how they expect a dialog with a user to progress, the intelligent personal assistant service ultimately makes the policy decisions about how to phrase a query and when to ask such queries within a conversation/dialogue. When task owners/task owner resources do not have to worry about policy decisions, processing efficiency for task execution programming can be greatly improved. Further, task owners may work with applications executing different programming languages from that of an external application/service such as an intelligent personal assistant, among other examples. Re-writing process flow charts in different programming languages to integrate with different products/services may be in-efficient and in some cases infeasible. Processing operations executed in the present application not only can utilize process flow charts but also transform processing flows provided by task owners to adapt to a CU system. Adaptation of a process flow chart can, for task owner resources, improve programming efficiency and provide extensibility to integrate their applications with other applications/services.

Furthermore, examples of the present disclosure extend to management of a hierarchy of data exchange task definitions. A hierarchy of data exchange task definitions may be maintained by a CU system to assist with task state tracking. As described above, a data exchange task definition may comprise a plurality of data structures. An entire data exchange task definition or portions of a data exchange task definition (e.g., one or more data structures) may be shared (system-wide) to enable developers to leverage data exchange task definitions, for example, to build other data exchange task definitions for different tasks. Information can be shared across the tasks in the hierarchy where commonality can be inferred between process flows.

Accordingly, the present disclosure provides a plurality of technical advantages including but not limited to: an improved CU system that is configurable to manage task definitions for task state tracking in a manner that is independent from task execution, a system that is scalable to be integrated with different applications/services, a system that is extensible to interface with a plurality of task owner resources (including third-party task owner resources), ability to un-constrain a process flow chart for a task that can account for a state of a dialogue, ability to generate data exchange task definitions and map exemplary data exchange task definitions to process flow charts for collection of parameter data for task execution, creation of hierarchical management for data exchange task definitions that improves programming efficiency and user experience through sharing of data from data exchange task definitions across different tasks, ability to improve user interaction (e.g. more natural user interactions) with a processing device during query processing, more efficient operation of a processing device (e.g., saving computing cycles/computing resources) when providing responses to queries, among other examples.

Figure 2A:
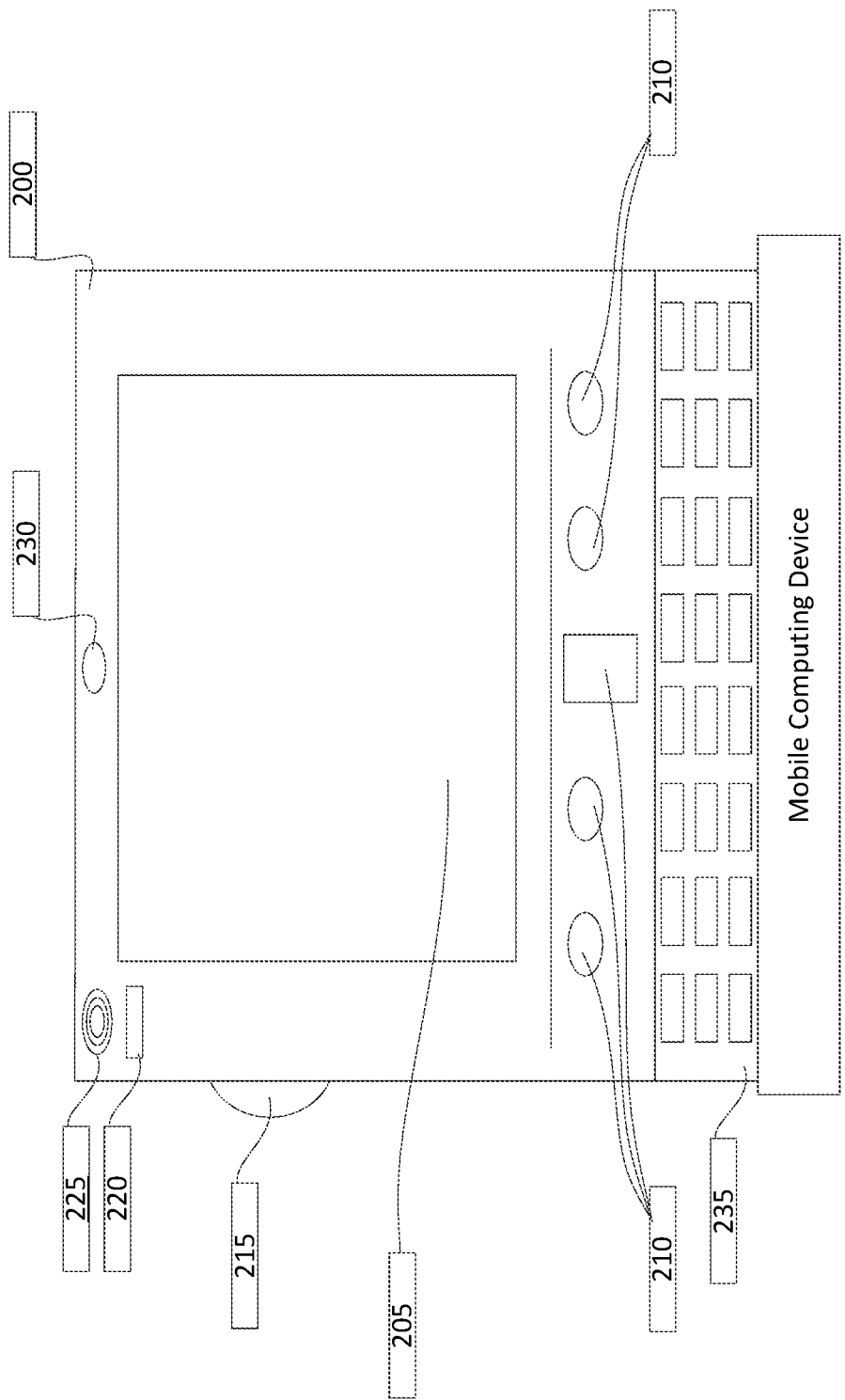
FIGS. 2A and 2B are simplified block diagrams of a mobile computing device with which aspects of the present disclosure may be practiced.
Figure 2B:
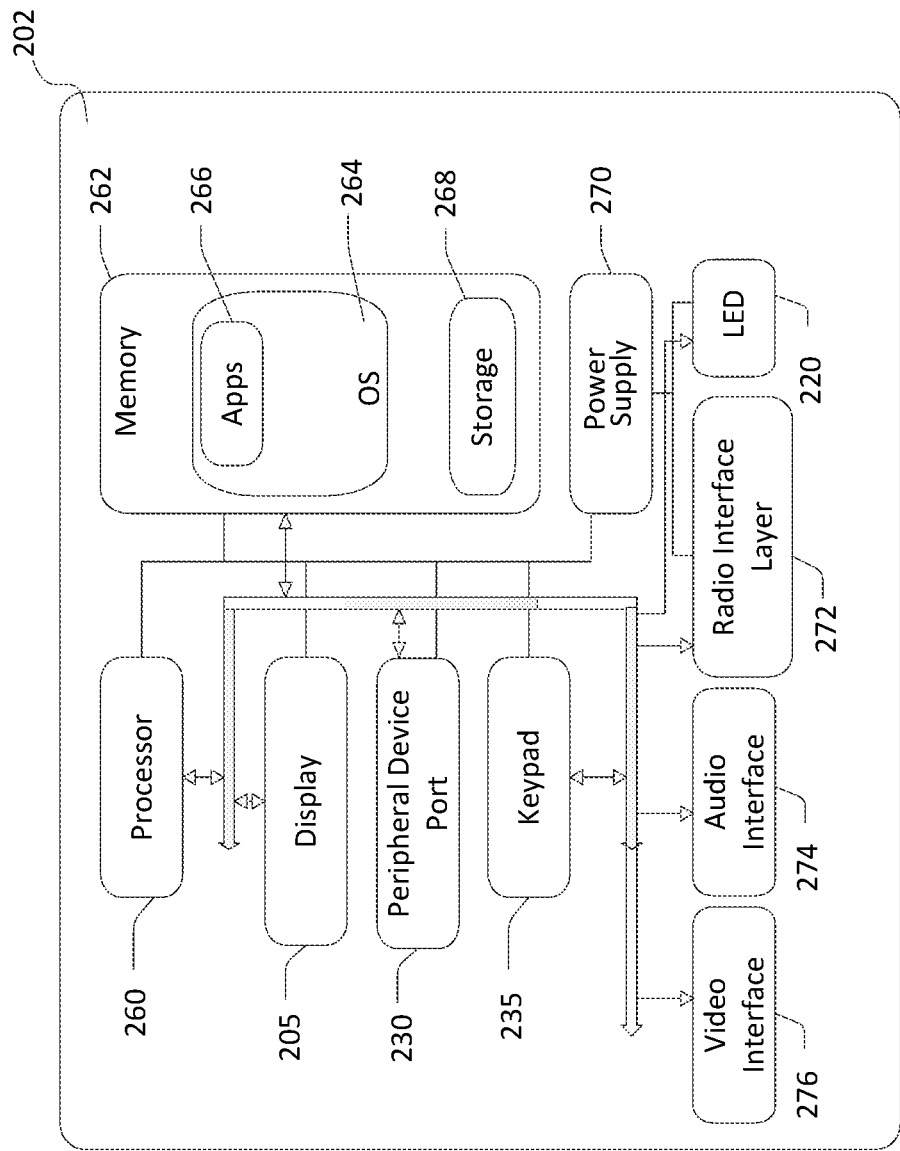
Figure 3:
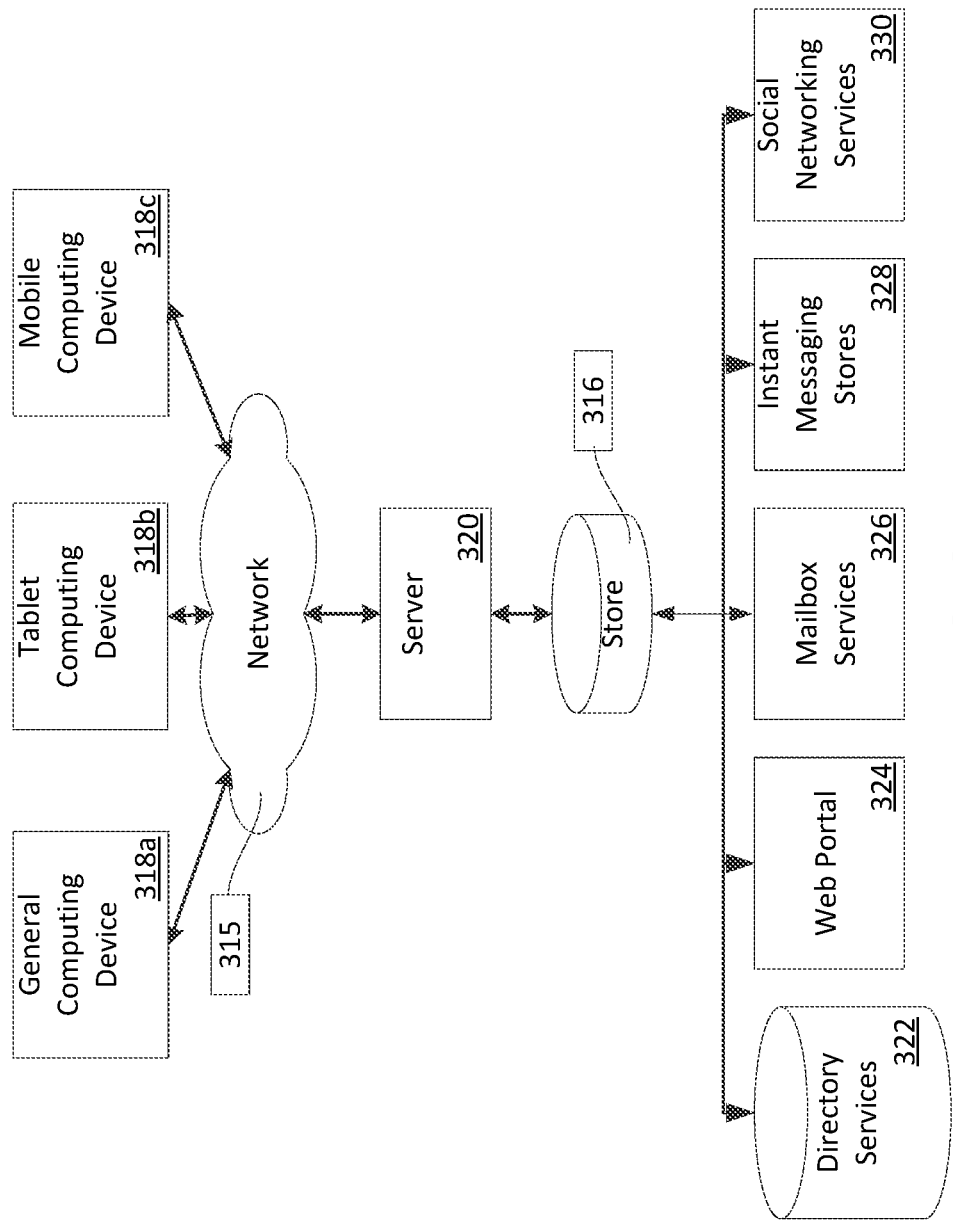
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to management and use of task definitions for task state tracking. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to management and use of task definitions for task state tracking. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices.

Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above.

The system of FIG. 3 may be an exemplary system for management and use of task definitions for task state tracking as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
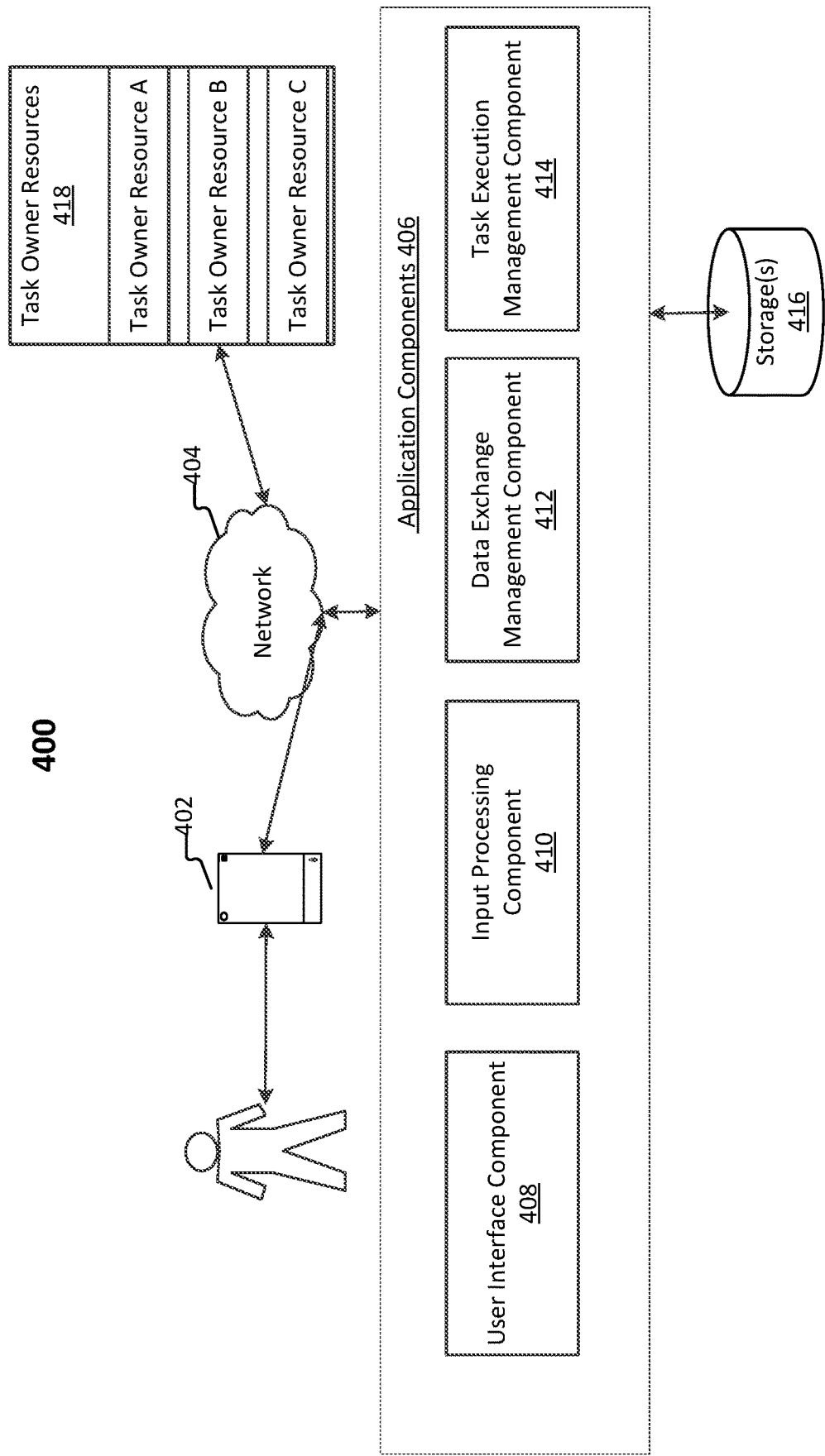
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related to management and use of task definitions for task state tracking as described herein. Exemplary system 400 presented is a combination of interdependent components that interact to form an integrated whole for incorporation and application of a CU system that is configured to implement task state tracking for collection of parameter data necessary for a task owner resource to execute a task. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Furthermore, it is presented that application components of system 400 may interface with other application services. Application services may be any resource that may extend functionality of one or more components of system 400. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. Exemplary system 400 comprises application components 406 including a user interface component 408, an input processing component 410, a data exchange management component 412 and a task execution management component 414, where each of the identified components may comprise one or more additional components.

System 400 may further comprise one or more storages 416 that may store data associated with operation of one or more components of system 400. In examples, storages 416 may interface with other components of system 400. Data associated with any component of system 400 may be stored in storages 416, where components may be connected to storages 416 over a distributed network including cloud computing platforms and infrastructure services. Exemplary storages 416 may be any of a first-party source, a second-party source, and a third-party source. Storages 416 are any physical or virtual memory space. Storages 416 may store any data for processing operations performed by components of system 400, retained data from processing operations, stored programs, code or application programming interfaces (APIs), training data, links to resources internal and external to system 400 and knowledge data among other examples. Furthermore, in examples, components of system 400 may utilize knowledge data in processing by components of system 400. Knowledge may be used by one or more components of system 400 to improve processing of any of the application components 406 where knowledge data can be obtained from resources internal or external to system 400. In examples, knowledge data may be maintained in storage(s) 416 or retrieved from one or more resources external to system 400 by knowledge fetch operation. In examples (as described below) storages 416 may storage exemplary data exchange task definitions, data used to create data exchange task definitions, and data for application components 406 to interface with other components such as task owner resources 418.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing applications/services. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices. Processing device 402 is an example of a user computing device.

The application components 406 are a collection of components configured for a CU system to interface with one or more task owner resources, for example, to pass data for task execution to a task owner resource. As identified above, application components 406 may comprise: user interface component 408, an input processing component 410, a data exchange management component 412 and a task execution management component 414. Conversational understanding systems are known to one skilled in the art, where operational examples are described in detail in co-pending U.S. patent application Ser. No. 14/797,444 (filed on Jul. 13, 2015) and, entitled TASK STATE TRACKING IN SYSTEMS AND SERVICES, which is hereby incorporated by reference. Examples herein relate to processing operations where a CU system can generate and manage data exchange task definitions to execute task state tracking, improving CU systems known in the art. U.S. patent application Ser. No. 14/797,444 further describes, among other things, examples where an exemplary CU system collects parameter data that can be passed to a task owner resource for task execution.

The user interface component 408 is one or more components that are configured to enable interaction with a user of a processing device. Transparency and organization are brought to users of a processing device through the user interface component 408 where an application/service can interact with a user processing device through the user interface component 408. As an example, the user interface component 408 may comprise generation and display of one or more user interface elements that may be displayed upon a processing device during execution of one or more applications. The user interface elements may be graphical icons used to represent information associated with an application. The user interface component 408 may further execute as a front-end for display (e.g., graphical user interface) of back-end processing performed by the other application components 406. In examples, user interface definition files may be used to define user interface elements for fostering interaction between a processing device and applications/services that may be associated with query processing. User interface definition files may comprise programming instructions or operations for management and display of user interface elements associated with user interface component 408. As an example, user interface elements may be used to illustrate operations including but not limited to: application management, receiving and processing of input, query entry and signal processing, providing responses, auto-complete suggestions, etc. Input may be received in any form including but not limited to: text input, voice input, handwritten input, user interface item selection, etc. A received query may be propagated to the input processing component 410 for further evaluation of a received query.

The input processing component 410 is a component that analyzes context associated with a received input. As an example, the input processing component 410 may be natural language understanding (NLU) component, a spoken language understanding (SLU) component, gesture recognition/understanding component, and/or affect/emotion/facial expression understanding component. However, one skilled in the art will recognize that operations of the input processing component 410 are not limited to examples such as NLUs and SLUs. The input processing component 410 may evaluate, contextual data associated with a result of a received input, for example, evaluating a domain, intent, and entities associated with a received input. In examples, the input processing component 410 may produce a triplet containing a domain, an intent, and tagged slots (e.g., classification of extracted entities), and can utilize information from the triplet to determine a task associated with a received input. For instance, a received query may include a request for execution of a task. An exemplary system 400 may be associated with an application/service that comprises components of a CU system to receive and process the query. Further detail related to processing of received input that may be executed by the input processing component 410 is described in U.S. patent application Ser. No. 14/797,444 (filed on Jul. 13, 2015) and, entitled TASK STATE TRACKING IN SYSTEMS AND SERVICES, which is hereby incorporated by reference. In examples, the input processing component 410 may be configured to detect a task associated with a received query, among other examples.

The data exchange management component 412 is a component that manages task state tracking for a CU system. Exemplary processing operations executed by the data exchange management component 412 are described in the description of method 500 (FIG. 5) and the description of method 600 (FIG. 6). As an example the data exchange management component 412 can interface with task owner resources 418 to receive process flow charts or for collecting information needed for task execution, among other information that can be utilized to generate an exemplary data exchange task definition. Further, the data exchange management component 412 maps a received process flow chart to an exemplary data exchange task definition. A data exchange task definition may be generated to assist a CU system managing a dialogue with at least one processing device. The data exchange management component 412 may make a policy decision about whether to follow a process flow indicated by a process flow chart or modify the process flow to improve an interaction with a user computing device during a dialogue. That is, in one example, the data exchange task definition may adapt the process flow chart for the task state tracking, by the conversational understanding system, based on a state of a dialogue with a user computing device. In some examples, modification of a process flow chart occurs offline, for example, at any point after a process flow chart is received from a task owner resource 418. In other examples, decisions related to modification of a process flow chart may occur during execution of a dialogue with the user. During adaption of the process flow chart, the data exchange task definition may apply validation conditions that can be used to evaluate a process flow chart. A validation condition is a condition that can be used to evaluate a state of task at any given time in a dialogue. When a process flow chart is mapped to a data exchange task definition, validation conditions can be used to evaluate whether parameter data for a task has been collected or not. In examples, validation conditions may be generated before a process flow chart is adapted to a data exchange task definition. Conversion of a process flow chart to a data exchange task definition maps a process flow chart to a data exchange task definition selects an appropriate validation condition from a library of pre-existing validation condition, or creates a stub definition for a new validation condition if a new validation is to be implemented to match a condition specified in the process flow chart. An exemplary data exchange task definition may comprise one or more validation conditions that can be used to make per-turn policy decisions. An exemplary data exchange task definition may comprise a plurality of data structures that may each equate to processing decisions at various points during a dialogue. A data structure of a data exchange task definition may comprise one or more validation conditions. For instance, validation conditions of a first data structure (e.g., related to a first-turn policy) may help shape a subsequent response during a dialogue.

As task owner resources 418 are typically focused on task execution rather than a state of a dialogue, process flow charts may not be configured to handle responses to queries that are un-accounted for. A process flow chart provided by a resource task owner may provide for specific answers (e.g. Yes or No). For instance, consider an example where a task is related to resetting of a value of a timer running on a user processing device. A system, following the resource task owner process flow, may output a query that asks a user if they would like to reset the timer. During processing of that flow chart, the only acceptable answers to that query (as recognized by the process flow chart) may be "yes" or "no" to indicate to the system whether the user would like to reset the timer. However, a user may provide a response such as: "yes, I would like to reset the timer to 30 seconds." If the system is merely utilizing the task owner resources' process flow chart, the system may: 1) freeze/get stuck because the response wasn't in the form the system anticipated; or 2) recognize only part of the response and send a subsequent query to the user asking what duration the timer should be reset. This results in inefficient processing during policy evaluation as well as frustration for the end user.

Moreover, the data exchange management component 412 may manage a hierarchy of data exchange task definitions (related to different tasks) that can be accessed when a given task is detected and parameter data for task execution is to be collected. In one example the data exchange management component 412 interfaces with storage(s) 416 that may maintain a plurality of data exchange task definitions, information from task owner resources 418, knowledge data, log data, etc. In one example, one or more storages (of storages 416) may manage data exchange task definitions for one or more tasks. A data exchanges task definition for a task (or individual data structures of a specific data exchange task definition) may be shared and used to build data exchange task definitions for other tasks. Processing operations may be applied to figure out what is common between process flows so that one or more portions of a data exchange task definition can be used to build data exchange task definitions for other tasks. In one instance, an application/service may be developed based on sharing data exchange task definitions.

Consider the example described above where a data exchange task definition is generated for resetting a timer application. A data exchange task definition may comprise a plurality of data structures that may each map to one or more portions of a process flow chart for a task of resetting a timer application, for example. The entire data exchange task definition (or one or more portions thereof) may be leveraged to enable developers to use data structures of the data exchange task definition to build data exchange task definitions for other tasks such as resetting an alarm application, resetting a clock application, and setting a reminder in a notes application, among other examples. Inferring the structure from a previously generated data exchange task definition improves processing efficiency, for example, when converting a process flow chart to a data exchange task definition that can be utilized by a CU system. Furthermore, use of similarly mapped data structures (spread across different tasks) may standardize the format of queries/responses during a dialogue with a user computing devices. This may provide users with a familiarity for task state tracking across different tasks, where a user can more quickly realize what a system is asking.

As identified above, storages 416 may also store other information provided by a task owner resource 418. For instance, systems or services associated with a CU system may interface with task owner resources 418 for generation of a data exchange task definition and/or during query processing for task state tracking management. Storages 416 may store resources for interfacing with task owner resources 418, which the data exchange management component 412 may utilize to interface with task owner resources 418. In other examples, storages 416 may storage one or more process flow charts from and any task actions (i.e. method to execute the target(s) action of the task) provided by task owner resources 418. The data exchange management component 412 may utilize such information to generate an exemplary data exchange task definition. In other examples, storages 416 maybe utilized to generate logs for task state tracking during one or more dialogues with a user computing devices. For instance, a CU system may utilize a data exchange task definition to generate a listing of data to be collected from a user computing device. Such a listing may be managed by the data exchange management component 412 or the task execution management component 414.

The data exchange management component 412 may further be configured to communicate with the task execution management component 414 to manage the collection of information needed for task execution. As identified above, an exemplary data exchange task definition may be utilized to perform task state tracking of information needed for task execution while managing a state of a dialogue with a user computing device. In doing so, the data exchange task definition may be utilized to generate a task state tracking listing of parameter data that is to be collected during a dialogue with a user computing device. As an example, the task state tracking listing may be a portion of the data exchange task definition or a separate file that is generated using the data exchange task definition. In some examples, the task state tracking listing may be managed by the task execution management component 414.

The task execution management component 414 may interface with the data exchange management component 412 and/or task owner resources 418 to send/receive data related to task execution. In one example the task execution management component 414 may be an interface between a CU system that performs task state tracking and a task owner resource 418 that executes a task. A task owner resource 418 may connect to system 400 through one of programming modules, an application programming interface (API), plugin, etc. As an example, the task execution management component 414 may be configured to interface with task owner resources 418 and provide the data exchange management component 412 with one or more process flow charts (among other information related to) collection of parameter data needed for execution of a task. The task execution management component 414 may be further configured to receive information that may be utilized to enable a CU system to generate a data exchange task definition as well as provide collected parameter data (from the data exchange management component 412) to a task owner resource 418 for task execution. In further instances, a task owner resource 418 may provide results data from task execution, where the task execution management component 414 may transmit the results data back to the data exchange management component 412 to generate a response to a query, for example, using an exemplary data exchange task definition.

As identified above, a task owner resource 418 is any resource (e.g., system component, application, service, etc.) that is used to execute a task/action. A task owner resource 418 is associated with a task owner that may execute a task. In examples, one or more task owner resources 418 (e.g. Task Owner Resource A, Task Owner Resource B, Task Owner Resource C) may be associated with management of execution of a task. Task owner resources 418 include but are not limited to: first party, second party, and third-party systems and/or application/services. Task Owner Resources 418 may comprise data related to: (i) process flow charts for collecting parameter data for task execution, (ii) parameter data resources (e.g. connection to backend knowledge sources), and (iii) Task Actions (i.e. method to execute the target(s) action of the task). Task owner resources 418 may interface with application components 406 to provide information needed for task execution, execute a task, and otherwise interface with application components 406 when necessary.

Figure 5:
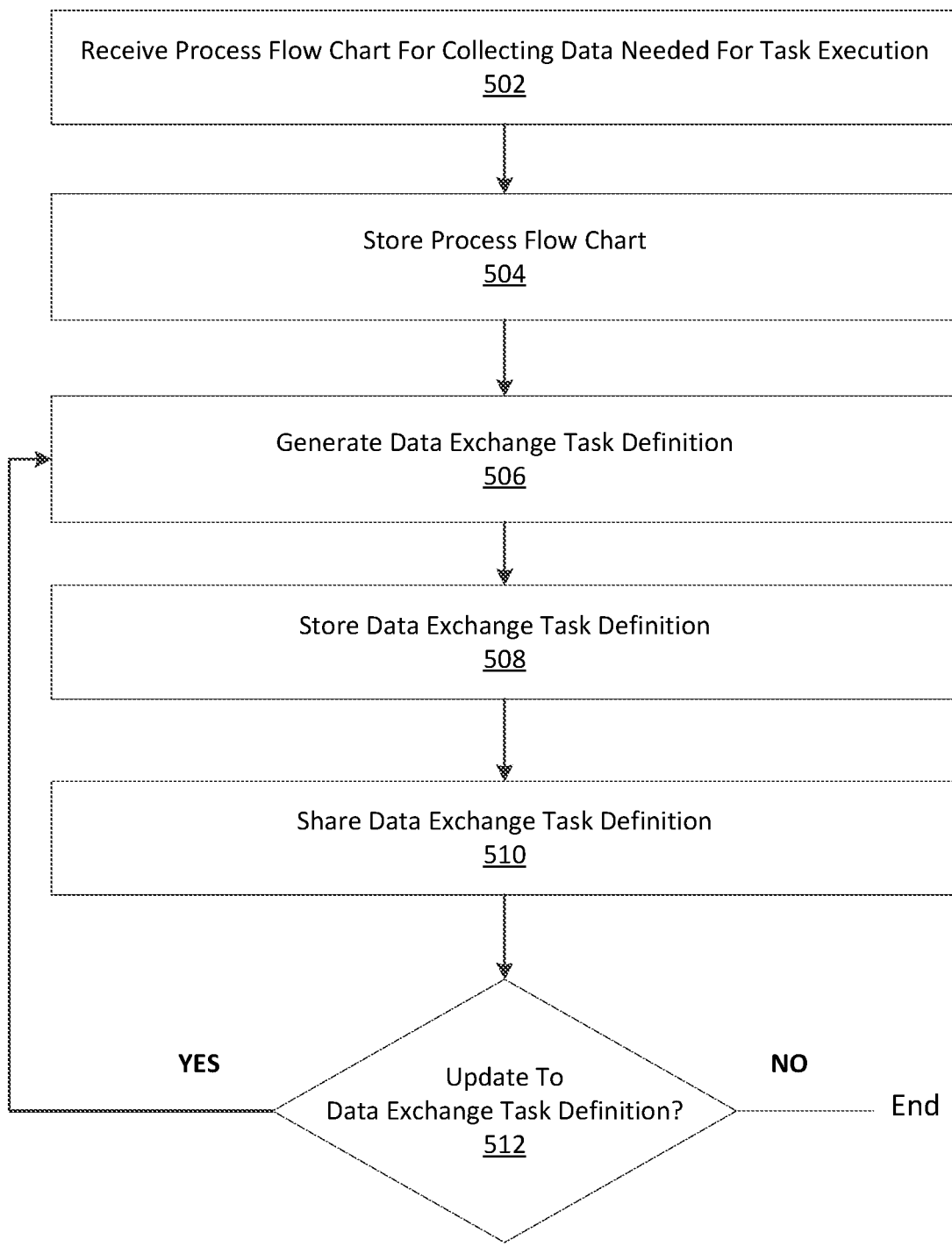
FIG. 5 is an exemplary method for generation and management of an exemplary data exchange task definition with which aspects of the present disclosure may be practiced.
Figure 6:
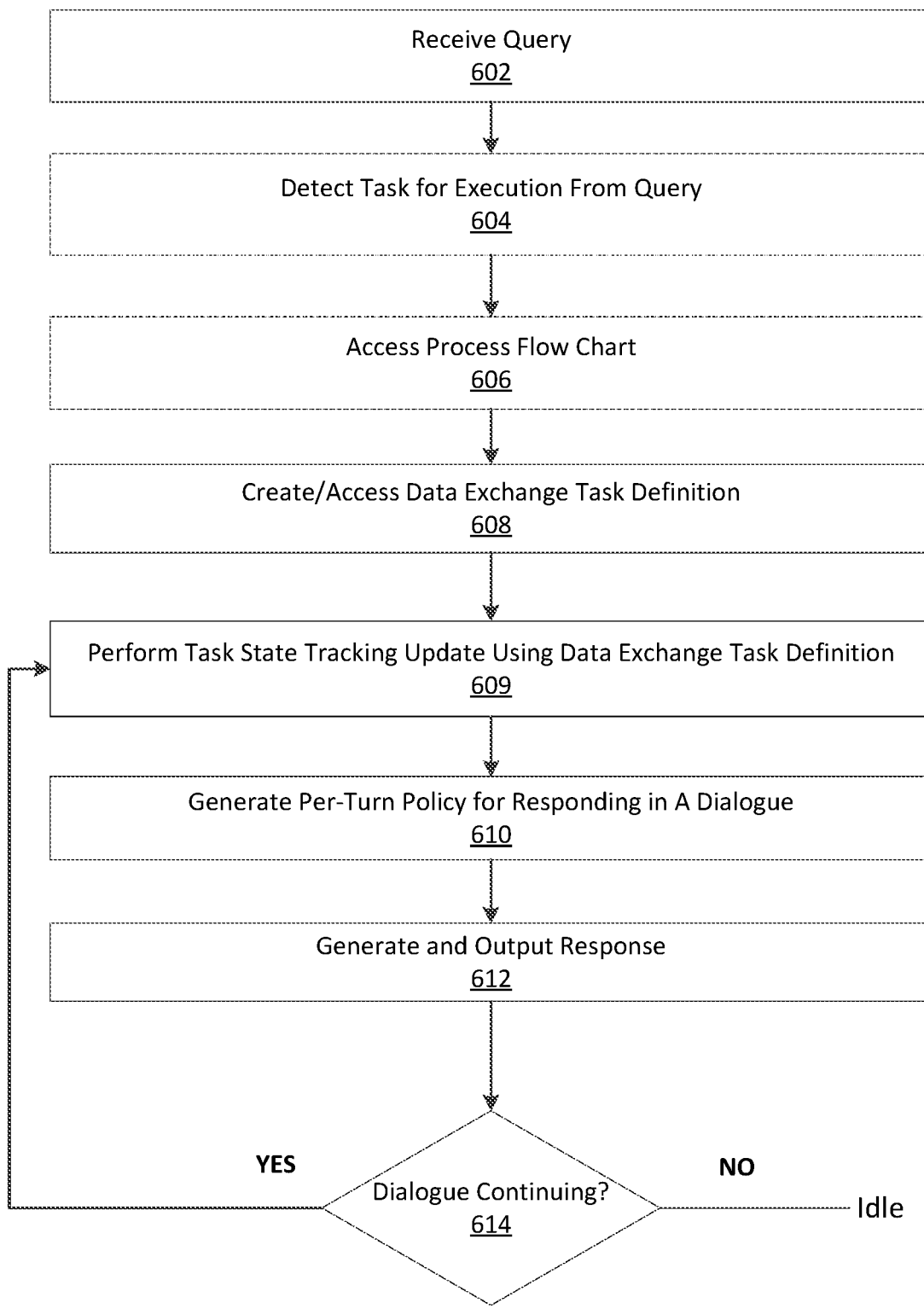
FIG. 6 is an exemplary method for using an exemplary data exchange task definition to improve task state tracking during a dialogue with which aspects of the present disclosure may be practiced.

FIG. 5 is an exemplary method 500 for generation and management of an exemplary data exchange task definition with which aspects of the present disclosure may be practiced. As an example, method 500 may be executed by an exemplary processing device and/or system such as those shown in FIGS. 1-4. In examples, method 500 may execute on a device comprising at least one processor configured to store and execute operations, programs or instructions. Operations performed in method 500 may correspond to operations executed by a system and/or service that execute computer programs, application programming interfaces (APIs), or machine-learning processing, among other examples. As an example, operations executed in method 500 may be performed by a data exchange management component 412 as described in the description of FIG. 4. In at least one example, a data exchange management component 412 may perform operations using multiple processing devices.

Method 500 begins at operation 502, where a process flow chart is received. As an example, the process flow chart may provide a process flow for collecting data needed for task execution. An exemplary process flow chart may be provided by a task owner resource that is to execute a task, where the process flow chart may provide a process flow for collection of parameter data needed for task execution by the task owner resource. In some examples, more than one process flow chart may be provided for processing, related to different aspects of the same underlying task or system (for example, different flow charts may be provided for setting a timer, querying the time remaining on an existing timer, resetting the timer interval, or deleting a timer currently running). In examples, an exemplary task owner resource is independent of a conversational understanding system that executes task state tracking for collecting the parameter data needed for task execution. An exemplary component of a CU system may receive (operation 502) the process flow chart(s), for example, to utilize the process flow chart for generation of an exemplary data exchange task definition. An exemplary process flow chart may be provided in any type of format. As an example, a process flow chart may be provided in a VoiceXML format, which is a digital document standard for specifying interactive media and voice dialogs between humans and computers.

Method 500 may proceed to operation 504, where the process flow chart is stored. For instance, storing (operation 504) of an exemplary process flow chart may be managed by a component associated with a CU system. As an example, a process flow chart may be stored in a storage (e.g., storage(s) 416 described in FIG. 4) connected with a system (e.g., system 400) that comprises a data exchange management component (e.g. data exchange management component 412 described in FIG. 4), which may access the process flow chart for task state tracking purposes. In examples, additional information that may useful for generation of an exemplary data exchange task definition may also be stored and access during creation of the data exchange task definition.

Continuing on, method 500 may proceed to operation 506, where a data exchange task definition is generated for collection of parameter data needed for task execution. Examples of a data exchange task definition are described throughout the foregoing. As an example, a data exchange definition adapts the process flow chart for task state tracking, by the conversational understanding system, based on a state of a dialogue with a user computing device. Generation (operation 506) of an exemplary data exchange task definition may comprise extracting a per-turn policy that allows a CU system to interact with a user computing device while affording flexibility during an interaction with the CU system. Operation 506 may comprise generating a per-turn policy for interacting with the user computing device based on the state of the dialogue and an evaluation of the process flow chart. At each turn in a dialogue, the CU system may evaluate the process flow chart in its own way. In doing so, a CU system may take a multi-turn process flow chart (provided by a task owner resource) and map that process flow chart to a data representation that adapts the process flow chart according to the state of a dialogue with a user computing device. As an example, a data structure, that is generated within a data exchange task definition evaluates the flow chart completely in a single turn (evaluate and process a resource task owners entire flow chart before making a policy decision regarding how to interact with a user) in a turn independent manner. In one instance, an exemplary data exchange task definition may take a process flow chart, presented in a voiceXML format, and map features from the process flow chart to a file format that is recognized by a CU system. In most examples, a file format of an exemplary data exchange task definition is a different file format from the process flow chart. While an exemplary data exchange task definition may take any file format, one example file format is TaskForm, which is a file format recognized by a task completion platform. As an example, operation 506 may comprise processing operations that map data structures from a process flow chart to data representations that may be used for developers of a CU system. For instance, extensible markup language (XML) structures from a VoiceXML process flow chart may be mapped to equivalent XML representations and one or more of representations of a Javascript Object Notation (JSON), among other examples. One or more portions (e.g. data representations) of an exemplary data exchange task definitions may be shared by developers, for example, to generate data exchange task definitions for other tasks by leveraging what has been already created.

As an example, mapping of data from a process flow chart to a data exchange task definition may comprise evaluating the structure of the process flow chart; what information is actually defined in process flow steps (is the prompt a confirmation, asking for a new value? Are two processing steps in a process flow chart related to the same parameter or asking about different parameters? An exemplary CU system may robust and have access to a plurality of different types of knowledge data that can be used to enhance processing of a query/response. Operation 506 may comprise evaluating particular steps in the process flow chart (e.g. what parameter is being collected and what conditions are associated with that parameter) and map one or more steps of the process flow chart to particular validation conditions, dialog act, semantic information, entity data, etc. that are recognized by the CU system. A process step in a process flow chart provided by a task owner resource may correspond to a data structure defined in the data exchange task definition, comprised of many more data fields, with the values of the data fields in the data exchange definition either extracted directly from the corresponding flow chart process step, or indirectly, inferred from other steps or elements in the flow chart. A data structure of a data exchange task definition may be definable by developers of a CU system. For instance, an exemplary data exchange task definition may comprise a plurality of JavaScript object notation (JSON) representations for data exchange that can be manipulated to work with a plurality of different programming languages. In examples, a data structure of a data exchange task definition may be sharable for developers to utilize and/or modify to generate data structures for other data exchange task definitions.

Operation 506 may further comprise executing multiple policy decisions for mapping a process flow chart into a per-turn dialogue of a multi-turn conversation with a user processing device. This per-turn policy may be used to generate responses throughout a multi-turn dialogue, for example, as many times as needed to collected parameter data needed for task execution. In examples, generation of an exemplary data exchange task definition may comprise generating a task state tracking listing that manages the collection of parameter data needed to execute a task. Examples related collection of parameter data and task state tracking are described in U.S. patent application Ser. No. 14/797,444 (filed on Jul. 13, 2015) and, entitled TASK STATE TRACKING IN SYSTEMS AND SERVICES, which is hereby incorporated by reference.

Flow may proceed to operation 508, where the data exchange task definition is stored. For instance, storing (operation 508) of an exemplary data exchange task definition may be managed by a component associated with a CU system. As an example, a data exchange task definition may be stored in a storage (e.g., storage(s) 416 described in FIG. 4) connected with a system (e.g., system 400) that comprises a data exchange management component (e.g. data exchange management component 412 described in FIG. 4), which may access the data exchange task definition for task state tracking purposes. As an example, a processing device may access an exemplary data exchange task definition via a network connection (e.g. distributed network).

Stored data exchange task definitions may be accessed at a later point in time. As an example, a stored data exchange task definition may be used to execute task state tracking during a dialogue with a user computing device. In another example, data from an exemplary data exchange task definition may be shared with other data exchange task definitions. In some examples, exemplary data exchange task definitions may be incorporated directly into products/applications/services.

Flow may proceed to operation 510, where data from an exemplary data exchange task definition is shared for use in generation of another data exchange task definition that may related to task state tracking of parameter data for another task. Operation 510 may comprise identifying sharable data from a data exchange definition including one or more data structures of a data exchange task definition. In one instance, a data structure of a data exchange task definition may comprise comment data that indicates, among other examples, what the data structure relates to and how it may be used in other situations. In other examples, an application or program may be developed to identify sharable data from a data exchange task definition and/or generate new data exchange task definitions.

Flow may proceed to decision operation 512, where it is determined whether there is an update to a data exchange task definition. If not, flow branches NO and ends or remains idle until further processing of a data exchange task definition is to occur. If it is determined that an update to a data exchange task definition is to occur, flow branches YES and returns back to processing operation 506, where a data exchange task definition can be modified or a new data exchange task definition may be created. In examples, task owner resources may remain in communication with an exemplary CU system for any number of purposes, including to provide updates to process flow charts, among other examples. Further, in other instances, knowledge data related to CU system processing (e.g., semantic data, entity data, slot tagging data, etc.) may change for a data structure and the task exchange task definition may be updated.

FIG. 6 is an exemplary method for using an exemplary data exchange task definition to improve task state tracking during a dialogue with which aspects of the present disclosure may be practiced. As an example, method 600 may be executed by an exemplary processing device and/or system such as those shown in FIGS. 1-4. In examples, method 600 may execute on a device comprising at least one processor configured to store and execute operations, programs or instructions. Operations performed in method 600 may correspond to operations executed by a system and/or service that execute computer programs, application programming interfaces (APIs), or machine-learning processing, among other examples. As an example, operations executed in method 600 may be performed by a data exchange management component 412 as described in the description of FIG. 4. In at least one example, a data exchange management component 412 may perform operations using multiple processing devices.

Method 600 begins at operation 602, where a query is received. As an example, a query may be received from a user computing device, for example, during a dialogue with an application/service that comprises a CU system. A user computing device may be any device example described in the foregoing including the description of FIGS. 1-4. Receipt (operation 602) of the query may initiate a dialogue with a user or the query may be received during an existing dialogue with a user, among other examples. An exemplary query may comprise a request for execution of a task.

Flow may proceed to operation 604, where a received query may be processed. As an example, operation 604 may comprise detecting a task intended for execution from the query. Operation 604 may comprise executing input understanding processing, for example, as described in the input processing component 410 of FIG. 4.

In some examples, flow may proceed to operation 606, where a process flow chart for the detected task may be accessed. As an example, a component of a CU system may identify a process flow chart for the collection of parameter data that is needed for a task owner resource to execute the task. In one example, a CU system may be configured to locate a process flow chart for a task in response to detection of a task from a received query. In some example systems, access (operation 606) to a process flow chart is an inferred processing step during creation of an exemplary data exchange task definition. For instance, an online conversion of a process flow chart occurs when an exemplary data exchange task definition is created collection of data for a particular task.

In some examples, an exemplary data exchange task definition is created/accessed as shown in operation 608. In other examples, generation of an exemplary data exchange task definition occurs offline, for example, at any point after a process flow chart is received from a task owner. In such examples, operation 608 may comprise accessing a data exchange task definition during querying processing.

In further examples, operation 608 may comprise creating an exemplary data exchange task definition online, for example, during execution of a dialogue with the user. As an example, an exemplary data exchange task definition may be dynamically generated during processing of the query. Examples of data exchange task definitions have been described throughout the foregoing. As an example, a data exchange task definition may be a stored data exchange task definition as described in examples of method 500 (FIG. 5).

In examples, the data exchange task definition may be utilized to perform (operation 609) a task state tracking update based on a state of a dialogue with a user computing device. As an example, in generating a first response to a user, a CU system may identify that none of the needed parameter data has been acquired from a dialogue with the user or alternatively one or more items of parameter data have been collected. This may help shape generation of a per-turn policy for communicating with a user computing device. As the dialogue progresses, task state tracking updates may be performed, for example, until necessary parameter data has been collected. In some examples, operation 609 may comprise managing a task state tracking listing as described in the foregoing.

Flow may proceed to operation 610, where the data exchange task definition is used to generate a per-turn policy for responding in a dialogue with a user computing device. Operation 610 comprises generating a per-turn policy that can be applied to evaluate any number of turns within a dialogue. As an example, the per-turn policy of the data exchange task definition can help guide a CU system when implementing task state tracking that accounts for a state of a dialogue with a user computing device. The data exchange task definition may be utilized to evaluate a process flow chart and develop a per-turn policy for continuing a dialogue with a user computing device. In some instances, the data exchange task definition may follow a process flow specified in a process flow chart. In other instances, the data exchange task definition may be configured to modify a process flow or format of queries/responses based on a state of a dialogue with a user computing device. The per-turn policy that is generated may take into account the state of the dialogue with the user computing device (e.g. based on task state tracking updates performed before generation of subsequent response).

Operation 610 comprises executing translational mapping of a process flow chart (e.g. at runtime or prior to query processing) to generate a new process flow for collection of parameter data that adapts to a state of the dialogue with a user computing device. In this way, the CU system can make policy decisions, while considering not only aspects of a process flow that are explicitly captured but also consider aspects that flow chart doesn't explicitly reject (but does not account for). This improves authoring efficiency (e.g., for task owner resources) as well as processing efficiency for a CU system when executing task state management during a dialogue.

For instance, when generating (operation 610) a per-turn policy for task state tracking, the data exchange task definition may apply validation conditions that can be used to evaluate a process flow chart. An exemplary data exchange task definition may comprise one or more validation conditions that can be used to make per-turn policy decisions.

In one instance, consider the example where a process flow chart is directed to collecting data to reset a timer application. If a user query indicates that the user would like to reset a timer application to a time of 30 seconds, the CU system can utilize the specified validation condition in the data exchange task definition to determine that it does not need to ask a user whether the user would like to reset the timer application or the duration of the reset. This can affect a next response by a CU system, where a response can be adapted away from a potentially repetitive query (that may occur if the CU system were simply following the process flow in a process flow chart). Continuing the timer application example, the CU system may be able to identify that a user has multiple timers operating on a user computing device. A validation condition may be set to help a CU system clarify which timer a user is referring to when the user says it wants to reset a timer application. Such a clarification may be useful in a response to the user query requesting reset of a timer.

Operation 610 may comprise the inference of policy overrides from process flow defined in a process flow chart. A policy override, which may be built into a policy generated for the data exchange task definition, may be a result of automatically evaluating a process flow chart using a data structure of a data exchange task definition. As an example, a first-turn policy may specify at least one policy override of the processing flow chart. The policy override may remove constraints of the process flow to improve the dialogue with the user computing device when outputting a response. For instance, a process flow chart may say to take X as a next action where the data exchange task definition may determine to do Y. In another example, a policy override may modify language of the response, compared with a proposed response to the query suggested in the process flow chart, in order to improve the dialogue with the user computing device when outputting the response. For instance, a process flow chart may require the system to output a specific response as a first response in a dialogue, where the data exchange task definition may determine to provide a different response given the state of the dialogue (e.g. in a less constrained manner as compared with the process flow chart).

Operation 610 may further comprise determining how to proceed with the dialogue based on a state of the dialogue with the user computing device. In one example, operation 610 may determine to proceed by generating a response to provide to a user computing device in order to continue a dialogue. Such a response may be for collecting necessary parameter data, confirmation, exchanging pleasantries in the dialogue, updating a user on a status of the task execution, etc. In another example, a CU system may identify that it has collected the necessary parameter data for task execution and can determine to pass the parameter data to a task owner resource for task execution (and/or continue a dialogue with a user computing device). At operation 610, a CU may utilize the data exchange task definition to determine when and how to request necessary parameter data during a dialogue.

Flow may proceed to operation 612, where a response to the query may be generated for output. As an example, generating (operation 612) a response for the query may be based on application of the per-turn policy of the data exchange task definition. Furthermore, operation 612 may comprise transmission or output of a response to the user computing device. In some examples, processing operations related to a CU system may be occurring remotely via a distributed network. In such an example, a generated response may be transmitted for display on a processing device (e.g., user computing device). In other examples, processing operations executed by a CU system may be occurring on a processing device (e.g. user computing device). In such examples, operation 612 may comprise displaying the response on a display associated with the user computing device.

Flow may proceed to decision operation 614, where it is determined whether the dialogue is to continue. If not, flow branches NO and processing remains idle until the dialogue is re-engaged or a new dialogue is received. As an example a subsequent query for the dialogue may be received. If it is determined that the dialogue is to continue, flow branches YES and returns to operation 609, where a task state tracking update is performed. In such an example, the data exchange task definition may update data collected from the user computing device and proceed to generate a second-turn policy for subsequent interaction with the user computing device based on the state of the dialogue and another evaluation of the process flow chart. A subsequent response to the subsequent query may be output based on the second-turn policy. Such a process may continue (e.g. third, fourth, fifth responses) in a multi-turn dialogue.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving, at a conversational understanding system, a query that includes a request for execution of a task, wherein the query initiates a dialogue between a user and a computing device;
detecting the task in the query;
in response to detecting the task, accessing a data exchange task definition for the task, wherein the data exchange task definition details a process flow for collecting parameter data needed for execution of the task by a task owner resource;
performing task state tracking based upon the data exchange task definition, wherein the task state tracking comprises monitoring receipt of the parameter data, and wherein a state of a dialogue is determined based upon the receipt of the parameter data;
generating, using the data exchange task definition, a per-turn policy for interacting with the computing device based on the state of the dialogue, wherein a new per-turn policy is generated per turn of the dialogue and is a process flow for collection of the parameter data that adapts to the state of the dialogue based on application of validation conditions that evaluate a process flow chart;
generating a response for the query based on application of the per-turn policy; and
providing, to the user computing device, the response to the query in order to continue the dialogue.

2. The method according to claim 1, wherein the conversational understanding system is independent from the task owner resource.

3. The method according to claim 2, further comprising: detecting the task based on input processing of the query; and identifying the process flow chart, provided by the task owner resource, that is associated with the detected task.

4. The method according to claim 1, further comprising:
receiving a subsequent query for the dialogue; and
outputting a subsequent response to the subsequent query based on application of the new per-turn policy of the data exchange task definition.

5. The method according to claim 1, wherein the per-turn policy specifies at least one policy override of a processing flow chart, and wherein the at least one policy override removes constraints of the process flow to improve the dialogue with the user computing device when outputting the response.

6. The method according to claim 1, wherein the per-turn policy specifies at least one policy override of a processing flow chart, and wherein the at least one policy override modifies language of the response, compared with a proposed response to the query suggested in the process flow chart, in order to improve the dialogue with the computing device when outputting the response.

7. The method according to claim 1, wherein the data exchange task definition is dynamically generated during processing of the query.

8. The method according to claim 1, wherein the per-turn policy is applicable to evaluate one or more of a plurality of turns in the dialogue, and wherein the response is generated based on application of the per-turn policy of the data exchange task definition.

9. The method according to claim 1, wherein information needed for task execution is provided by the task owner resource in a process flow chart, wherein the information comprises parameter data that is to be collected to enable the task owner resource to execute the task, and wherein the conversational understanding system determines when and how to request the parameter data during the dialogue by using the data exchange task definition.

10. A system comprising:
at least one processor; and
a memory operatively connected with the at least one processor storing computer-executable instructions that, when executed by the at least one processor, causes the at least one processor to execute a method that comprises:
receiving, at a conversational understanding system, a query that includes a request for execution of a task, wherein the query initiates a dialogue that allows a user to conversationally interface with a computing device;
detecting the task in the query;
in response to detecting the task, accessing a data exchange task definition for the task, wherein the data exchange task definition details a process flow for collecting parameter data for execution of the task by a task owner resource;
performing task state tracking based upon the data exchange task definition, wherein the task state tracking comprises monitoring receipt of the parameter data, and wherein a state of a dialogue is determined based upon the receipt of the parameter data;
generating, using the data exchange task definition, a per-turn policy for interacting with the computing device based on the state of the dialogue, wherein a new per-turn policy is generated per turn of the dialogue and is a process flow for collection of the parameter data that adapts to the state of the dialogue based on application of validation conditions that evaluate a process flow chart;
generating a response for the query based on application of the per-turn policy; and
continuing the dialogue by providing the response.

11. The system according to claim 10, wherein the conversational understanding system is independent from the task owner resource.

12. The system according to claim 11, wherein the method, executed by the at least one processor, further comprises: detecting the task based on input processing of the query, and identifying a process flow chart, provided by the task owner resource, that is associated with the detected task.

13. The system according to claim 10, wherein the method, executed by the at least one processor, further comprises:
receiving a subsequent query for the dialogue,
generating, using the data exchange task definition, a subsequent response for the subsequent query based on application of the new per-turn policy of the data exchange task definition, and
outputting the subsequent response for display.

14. The system according to claim 10, wherein the per-turn policy specifies at least one policy override of the processing flow chart, and wherein the at least one policy override removes constraints of the process flow to improve the dialogue with the user computing device when outputting the response.

15. The system according to claim 10, wherein the per-turn policy specifies at least one policy override of the processing flow chart, and wherein the at least one policy override modifies language of the response, compared with a proposed response to the query suggested in the process flow chart, in order to improve the dialogue with the user computing device when outputting the response.

16. The system according to claim 10, wherein the data exchange task definition is pre-generated before the query is received, and wherein the accessing accesses the data exchange task definition from a storage connected with the system by a distributed network.

17. The system according to claim 10, wherein the per-turn policy is applicable to evaluate one or more of a plurality of turns in the dialogue.

18. The system according to claim 10, wherein information needed for task execution is provided by the task owner resource in a process flow chart, wherein the information comprises parameter data that is to be collected to enable the task owner resource to execute the task, and wherein the conversational understanding system determines when and how to request the parameter data during the dialogue by using the data exchange task definition.

19. A computer storage medium encoding computer-executable instructions that, when executed by at least one processor, performs a method comprising:

receiving, at a conversational understanding system, a query that includes a request for execution of a task, wherein the query initiates a dialogue that allows a user to conversationally interface with a computing device;

detecting the task in the query;

in response to detecting the task, accessing a data exchange task definition for the task, wherein the data exchange task definition details a process flow for collecting parameter data for execution of the task by a task owner resource;

performing task state tracking based upon the data exchange task definition, wherein the task state tracking comprises monitoring receipt of the parameter data, and wherein a state of a dialogue is determined based upon the receipt of the parameter data;

generating, using the data exchange task definition, a per-turn policy for interacting with the computing device based on the state of the dialogue, wherein a new per-turn policy is generated per turn of the dialogue and is a process flow for collection of the parameter data that adapts to the state of the dialogue based on application of validation conditions that evaluate a process flow chart;

generating a response for the query based on application of the per-turn policy; and continuing the dialogue by providing the response.

20. The computer storage medium of claim 19, wherein the per-turn policy is applicable to evaluate one or more of a plurality of turns in the dialogue, and wherein the response is generated based on application of the per-turn policy of the data exchange task definition.

* * * * *